United States Patent Office 3,644,524
Patented Feb. 22, 1972

3,644,524
COMBATING WEEDS WITH O-ACYL-3,5-DIALKYL-4-HYDROXYBENZALDOXIMES
Roger P. Cahoy, Merriam, Kans., assignor to Gulf Research & Development Company, Pittsburgh, Pa.
No Drawing. Original application Nov. 30, 1967, Ser. No. 686,809, now Patent No. 3,503,732, dated Mar. 31, 1970. Divided and this application Aug. 19, 1969, Ser. No. 870,739
Int. Cl. C07c 131/00
U.S. Cl. 260—566 AE
2 Claims

ABSTRACT OF THE DISCLOSURE

In a variety of crops, including broad-leaf species such as tomatoes and soybeans, as well as corn and small grains, particularly rice and wheat, control of noxious grasses, including crabgrass, wild oats, foxtail and shattercane is obtained by preemergent application of compounds having the structural formula

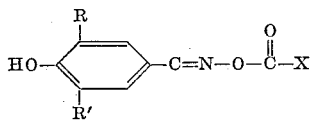

in which R and R' are non-primary alkyl or cycloalkyl substituents having at least 3 carbon atoms and X is an electronegative substituent, for example, dichloromethyl, or an unsaturated hydrocarbon structure such as phenyl or cyclopropyl.

This is a division of co-pending application Ser. No. 686,809, filed Nov. 30, 1967, now Pat. No. 3,503,732.

DESCRIPTION OF INVENTION

Chemical methods of combating weeds are of two general types; those in which a weed control agent is applied before the emergence of the weeds from the soil and those in which the chemical is applied after emergence of the weeds. By use of a herbicide of the proper selectivity, either method may be used either before or after emergence of the crop plants. In general, more efficient use of plant nutrients and better yields of crops are obtained if the weeds are killed either before emergence or shortly thereafter. For some or the more sensitive crops such as soybeans and tomatoes, however, it is difficult to use an effective amount of herbicide without severe injury to the crop and consequent loss of yield. This is particularly true when an effort is made to control some of the noxious grasses such as shattercane and giant foxtail.

I have discovered a relatively small group of herbicides which may be used for preemergent control of noxious grasses and when used in effective amounts in this manner, appear to have no significant post-emergent activity. These compounds are therefore particularly useful for pre-emergent weed control in standing crops.

The effective compounds of this invention are O-aryl-substituted benzaldoximes having the structural formula

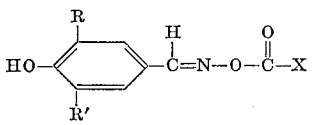

in which R and R' are non-primary aliphatic hydrocarbon substituents having at least 3 carbon atoms and X is an electronegative substituent group.

The selection of the electronegative substituent group is of critical importance with respect to the phytotoxic properties. When R and R', for example are both tertiary butyl, and X is methyl or chloromethyl, these compositions are particularly useful for pre-emergent control of crabgrass in freshly seeded lawns. If X is cyclopropyl or phenyl, a greater variety of grasses may be controlled by pre-emergent treatment, including wild oats and brome grass, in the presence of either freshly planted or standing crops of soybeans, cotton, wheat and corn. When X is dichloromethyl, this composition, when used in suitable quantities effects pre-emergence control of crabgrass, wild oats, brome, barnyard grass, pigweed, green foxtail, giant foxtail and shattercane without significant injury to either standing crops or freshly planted wheat, rice, soybeans, corn, grain sorghum or tomatoes. The weed control compositions of this invention are particularly suited to modern intensive agricultural techniques in which large plant populations are employed and it is not feasible to cultivate mechanically between planting and harvest. The weed control agents of this invention may be readily manufactured by suitable modifications of the procedures presented for illustrative purposes below.

PREPARATION OF WEED CONTROL AGENTS

The 3,5-di-tert.butyl-4-hydroxybenzaldehyde and 3,5-di-tert.butyl-4-hydroxybenzaldoxime, in general, may be prepared by the method of L. Cohen, J. Org. Chem., 22, 1334 (1957) as illustrated by the following procedure:

(A) Preparation of 3,5-di-tert.butyl-4-hydroxybenzaldehyde

A two liter round-bottomed flask was charged with 80 g. (0.36 mole) of 2,6-di-tert.butyl-4-methylphenol, 900 ml. of glacial acetic acid and 200 ml. of water. With mechanical stirring, the mixture was warmed to 50° C. to facilitate solution of the phenol. The solution was cooled to 20°. Two equivalents of bromine (37 ml.) was added dropwise to the stirred reaction mixture over a period of two hours. Stirring was continued for an additional hour and the reaction mixture was poured into 500 ml. of ice water. The suspension was cooled in an ice bath and the light yellow product was collected on a vacuum filter. The filter cake was washed with dilute acetic acid, followed with several water washings. The crude product was dissolved in one liter of ethanol. While being cooled in an ice bath, the addition of 150 ml. of water precipitated the compound. The dried product weighed 47.2 g. (56% yield) and melted at 188–190° C.

(B) Preparation of 3,5-di-tert.butyl-4-hydroxybenzaldoxime

A solution of 8.3 g. (0.12 mole) of hydroxylamine hydrochloride and 10 ml. of water was added to 23.4 g. (0.10 mole) of 3,5-di-tert.butyl-4-hydroxybenzaldehyde dissolved in 400 ml. of methanol. After adding 4.8 g. (0.12 mole) of sodium hydroxide dissolved in 8 ml. of water, the reaction solution was warmed at 50° C. for five minutes. Some solid material was noted in the reaction flask after allowing the solution to stand 2.5 hours at ambient temperature. The suspension was treated with an equal volume of water, cooled and the product was collected on a vacuum filter. The vacuum dried oxime weighed 22.9 g. (92% yield) M.P. 128–30° C.

(C) Preparation of o-dichloroacetyl-3,5-di-tert.butyl-4-hydroxybenzaldoxime

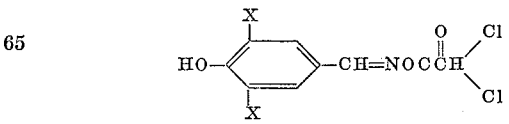

A solution of 7.0 g. (0.028 mole) 3,5-di-tert.butyl-4-hydroxybenzaldoxime, 13.5 g. (0.056 mole) of dichloroacetic anhydride and 100 ml. of glacial acetic acid was stirred at 25–35° for thirty minutes. The yellow solution was poured into 500 ml. of ice water. A yellow oil separated which rapidly crystallized. The collected solid was washed with water, dissolved in benzene and dried over sodium sulfate. The drying agent was removed and most of the benzene was evaporated. The residual oil was dissolved in hexane. Crystallization yielded 7.5 g. of O-dichloroacetyl - 3,5 - di - tert.butyl - 4 - hydroxybenzaldoxime, M.P. 109–10°.

Analysis.—Calculated for $C_{17}H_{23}Cl_2NO_3$ (percent): C, 56.68; H, 6.43; Cl, 19.68; N, 3.89. Found (percent): C, 55.57; H, 6.34; Cl, 20.10; N, 4.10.

The following compounds are also prepared by essentially the same as illustrated above, by employing the appropriate acyl halide or acid anhydride.

O-acetyl-3,5-ditert.butyl-4-hydroxybenzaldoxime M.P. 135–7° C.
O-chloroacetyl-3,5-ditert.butyl-4-hydroxybenzaldoxime M.P. 128–9° C.
O-benzoyl-3,5-ditert.butyl-4-hydroxybenzaldoxime M.P. 126–7° C.
O-cyclopropanecarbonyl-3,5-ditert.butyl-4-hydroxybenzaldoxime M.P. 128–30° C.

PRE-EMERGENT WEED CONTROL

The weed control chemicals exemplified above were sprayed on soil in which there was planted seeds of crabgrass, oats, wheat, rice, barnyard grass, pigweed, soybeans, green foxtail, giant foxtail shattercane and corn. The weed control agents were also sprayed on standing millet, soybean, cotton, alfalfa, oats, corn, flax, radish, sugar beet, wheat, grain sorghum and tomato plants at an application rate of 5 lb. per acre, to test for injurious post-emergent effects. The spray mixtures were prepared in the customary manner, by making up a dispersible concentrate or wettable powder employing commercial solvents, emulsifiers and dispersing agents which are available and recommended for use in manufacturing pesticide formulations. The spray mixtures employed in the tests described herein were made according to essentially the same procedures and formulations as those disclosed in U.S. Pat. 3,277,107. The results are summarized in the following examples.

EXAMPLE 1

At an application rate of 4 lb. per acre, O-chloroacetyl-3,5 - ditert.butyl - 4 - hydroxybenzaldoxime gave substantially complete pre-embergent control of crabgrass without significant injury to the seeds of wheat, rice, soybeans or corn. There was no significant post-emergent effect on any of the standing crops at an application rate of 5 lb. per acre.

EXAMPLE 2

At an application rate of 2 lb. per acre, O-cyclopropanecarbonyl - 3,5 - ditert.butyl - 4 - hydroxybenzaldoxime gave substantially complete preemergent control of crabgrass, wild oats and brome grass without significant injury to seeds of wheat, rice, soybeans or corn. There was no significant post-emergent effect in any of the standing crops at an application rate of 5 lbs. per acre.

EXAMPLE 3

At an application rate of 2 lb. per acre, O-benzoyl-3,5-ditert.butyl-4-hydroxybenzaldoxime gave substantial complete pre-emergent control of crabgrass, wild oat and brome grass and better than 50 percent control of giant fox-tail and shattercane without significant injury to seeds of wheat, rice, soybeans or corn. At a pre-emergent application rate of 10 lb. per acre there was significant injury to corn seeds, as well as to alfalfa, flax and sugar beet seeds. There was no significant post-emergent effect on any of the standing crops at an application rate of 5 lb. per acre.

EXAMPLE 4

At an application rate of 2 lb. per acre, O-dichloroacetyl-3,5-ditert.butyl-4-hydroxybenzaldoxime gave substantially complete pre-emergent control of crabgrass, wild oats, brome grass, pigweed, giant foxtail and shattercane and better than 50 percent control of barnyard grass and green foxtail, without significant injury to rice, soybeans or corn seeds. There was slight injury to wheat, for which compensation is possible by planting thicker. There was no significant post-emergent effect on any of the standing crops at an application rate of 5 lb. per acre.

The above illustrative examples show the unique characteristics of the weed-control agents of this invention, that is, beneficial selectivity in pre-emergent application coupled with an extraordinary absence of post-emergent effects on standing crops. These characteristics make it feasible to spray at moderate rates at or near planting time, followed by more drastic application at higher rates after the crop is standing, to prevent emergence of weeds until after the crop has grown enough foliage to shade out other plant growth. In using this system of weed control, the second application may be done by aerial spraying, so that it is not necessary to enter the field to cultivate between planting and harvest.

I claim:
1. O - dichloroacetyl-3,5-ditert.butyl-4-hydroxybenzaldoxime.
2. O-chloroacetyl - 3,5 - ditert.butyl-4-hydroxybenzaldoxime.

References Cited
UNITED STATES PATENTS 3,117,987  1/1964  Horrom ........ 260—566 AE
3,165,392  1/1965  Koopman ........ 260—566 AE LEON ZITVER, Primary Examiner G. A. SCHWARTZ, Assistant Examiner U.S. Cl. X.R.

Utility adequately classified in parent application, now Pat. No. 3,503,732.